UNITED STATES PATENT OFFICE 2,468,764

METHOD FOR DEHYDRATING AMYL ALCOHOLS

Pierre Alfred Laurent, Paris, France; vested in the Attorney General of the United States No Drawing. Application June 6, 1945, Serial No. 597,942. In France May 26, 1941

Section 1, Public Law 690, August 8, 1946
Patent expires May 26, 1961

3 Claims. (Cl. 260—682.)

The object of the present invention is a method for obtaining lubricating oils from amyl alcohol, comprising mainly the following phases:

I Transformation of amyl alcohol into suitable amylenes,
II Polymerisation of the amylenes under the required conditions, and
III Treatment of the obtained polymer, leading to the required lubricating oils.

These various phases are described below:

I. Transformation of amyl alcohol into suitable amylenes

The raw material consists of isoamyl alcohols boiling from 129 to 131° C. These alcohols are subjected to dehydration according to any known procedure. It is preferable, however, to effect the dehydration catalytically, in the vapour phase. The amylenes obtained are thereafter rectified to separate the water formed during dehydration and the small amounts of alcohol which have not been dehydrated. The amylenes proper are thereafter used as such, if their mixture presents the desired composition, or fractioned to allow—for the subsequent reactions—the mixture of the various amylenes in the suitable proportions to be made up, which then leads to the desired results. The applicant has found, indeed, that the use of the various isomers of amylene is not unimportant: the yield of viscous products and the degree of viscosity obtained are strongly influenced by the choice of the isomer. Under otherwise equal conditions, the yield of viscous products obtained is about 18% with respect to the amyl alcohol used, starting from the mixture rich in trimethylethylene, while the yield will rise up to 65% and more when using a mixture containing about 50% isopropylethylene:

It is well known that isoamyl alcohol

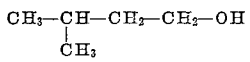

forms upon dehydration, not only isopropylethylene

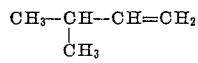

but also trimethylethylene

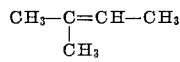

and also that unless special precautions are taken, the latter is formed in greater proportion. Furthermore, if isopropylethylene is led over a bed of alumina at 500° C., it is almost entirely transformed into trimethylethylene (Traite de Chimie organique, de Grignard, vol. III, page 117).

The applicant has found that the choice of the catalyser and the manner in which the catalysis is conducted exerts a direct effect upon the proportion of the various amylenes obtained: for instance if the dehydration is carried out in the vapour state at 260° C. over charcoal or activated carbons impregnated with 85% phosphoric acid, there will be obtained chiefly trimethylethylene; while, if operating at 330–370° C. over activated alumina, the proportion of isopropylethylene is much greater and may amount to more than 50% of the mixture of amylenes. In the following, there will be described, by way of example, the working with amylenes prepared by catalytic dehydration over activated alumina at 360° C.

II. Polymerisation of the amylenes

The condensation agent employed is anhydrous aluminium chloride. In a mixer provided with a cooling device, there is introduced first one volume of a volatile solvent such as petroleum ether, corresponding to about 25% to 50% of the volumes of amylenes to be treated, and thereupon about 10% of pulverised anhydrous aluminium chloride is added. The mixed mass is cooled down to about −10 to −5° C. and then the amylene is introduced slowly under vigorous agitation with avoidance of a rise in temperature, the reaction being highly exothermic.

Instead of introducing the amylenes in admixture, one may introduce first one of the isomers, for instance the isopropylethylene, and then, when the reaction is ended upon this fraction, the remaining isomer or isomers or a mixture of these may be added.

It will be observed that the adjustment of the temperature at which the mass is maintained is very important: as a general rule, the viscosity of the products finally obtained is higher when the temperature is maintained comparatively low. On another hand, the concentration conditions of the amylenes play a very important part. If, for instance, the amylenes are diluted in an equal volume of petroleum ether before being introduced into the mixer in the presence of aluminium chloride, the reaction will be quite different and the desired viscous products are not obtained. The proportion of petroleum ether—given by way of example as 25% to 50% of the volume of amylenes—will therefore be adjusted according to the final result desired.

III. Treatment of the polymer

After the total amount of amylenes has been put into reaction, the agitation is stopped and the aluminium chloride which has not entered reaction is separated, a simple decantation may be sufficient for this. The liquid part is washed with cold water containing 10% hydrochloric acid, and then with fresh water, 2 to 3% powdered calcium carbonate are added and the mass is heated to drive off the petroleum ether. The latter is condensed and returned to the manufacturing cycle. The heating is carried up to 160° C. in order to destroy the chlorinated products which may have been formed and the decomposition products of which are neutralised by the calcium carbonate. The mass is filtered and the clear liquid obtained constitutes the lubricant ready for use. The yield in lubricant amounts to over 65% with respect to the amyl alcohol used.

An additional treatment consists in adding to the lubricant heated to 110–120° C. an activated earth, in the proportion of about 5%. Mixing is done to ensure contact, and then it is filtered. During this operation, the viscosity of the oil increases slightly.

The applicant has found, in addition, that the time interval separating the third phase from the second may play a very important part, in this sense that if, after the whole of the amylenes have been set into reaction, and the mixing, and consequently the contact with the nonreacted aluminium chloride be continued, the viscosity will increase up to a maximum and then decrease. The iodine index, on the contrary, will constantly decrease. By varying the time of contact, it is thus possible either to adjust the viscosity to the desired value, or better, the iodine index.

In the polymerisation, it is possible to replace the aluminium chloride by boron fluoride or iron, bismuth or antimony chlorides.

Finally the last two phases may be applied to amylene mixtures which are rich in isopropylethylene and obtained, for instance, by treating and enriching natural or refinery gases, or by any other means, instead of starting from a mixture of amyl alcohols containing large proportions of isoamyl alcohol.

What I claim as my invention and desire to secure by Letters Patent is:

1. A method of making a mixture of amylenes rich in isopropylethylene and adapted to be polymerized to produce a lubricant, which comprises dehydrating isoamyl alcohols boiling from about 129° C. to 131° C. in the presence of an alumina catalyst by passing the vapors of the alcohol into contact with the catalyst at a temperature between 330° C. and 370° C. to produce a mixture of amylenes containing a major proportion of isopropylethylene.

2. A method of making a mixture of amylenes rich in isopropylethylene and adapted to be polymerized to produce a lubricant, which comprises dehydrating isoamyl alcohol in the presence of an alumina catalyst by passing the vapors of the alcohol over said catalyst at a temperature between 330° C. and 370° C. to produce an amylene mixture containing a major proportion of isopropylethylene.

3. A method of making a mixture of amylenes rich in isopropylethylene and adapted to be polymerizable to produce a lubricant, which comprises dehydrating isoamyl alcohol in the presence of an activated alumina catalyst by passing vapors of the alcohol over said catalyst at a temperature of about 360° C. to produce an amylene mixture containing a major proportion of isopropylethylene.

PIERRE ALFRED LAURENT.

REFERENCES CITED

The following references are of record in the file of this patent:

UNITED STATES PATENTS

| Number | Name | Date |
| --- | --- | --- |
| 1,913,938 | Metzger et al. | June 13, 1933 |
| 2,175,359 | Ocon | Oct. 10, 1939 |
| 2,220,307 | Whiteley et al. | Nov. 5, 1940 |
| 2,329,714 | Grasshof | Sept. 21, 1943 |

FOREIGN PATENTS

| Number | Country | Date |
| --- | --- | --- |
| 313,426 | Great Britain | Nov. 28, 1928 |
| 844,144 | France | Apr. 11, 1939 |

OTHER REFERENCES

Sullivan et al. & E. Chem. 23, 604–611.